United States Patent
Hanke et al.

(10) Patent No.: US 11,590,423 B2
(45) Date of Patent: Feb. 28, 2023

(54) MULTI-USER ROUTE TRACKING IN AN AUGMENTED REALITY ENVIRONMENT

(71) Applicants: Niantic, Inc., San Francisco, CA (US); Niantic International Technology Limited, Bristol (GB)

(72) Inventors: John Hanke, Piedmont, CA (US); Chihiro Kanno, Kawasaki (JP); Yuki Sonoda, Saitama (JP); Tatsuo Nomura, Tokyo (JP); Kousuke Kawahira, Tokyo (JP); Kentaro Morikawa, Tokyo (JP); Hiroki Asakawa, Tokyo (JP); Shunsuke Uematsu, Tokyo (JP); Madoka Katayama, Tokyo (JP); Motoki Yano, Kyoto (JP)

(73) Assignee: Niantic, Inc., San Francisco, CA (US)

( * ) Notice: Subject to any disclaimer, the term of this patent is extended or adjusted under 35 U.S.C. 154(b) by 0 days.

(21) Appl. No.: 17/216,381

(22) Filed: Mar. 29, 2021

(65) Prior Publication Data
US 2022/0305388 A1      Sep. 29, 2022

(51) Int. Cl.
*A63F 13/65* (2014.01)
*A63F 13/216* (2014.01)
(Continued)

(52) U.S. Cl.
CPC ............ *A63F 13/65* (2014.09); *A63F 13/216* (2014.09); *A63F 13/57* (2014.09); *A63F 13/69* (2014.09);
(Continued)

(58) Field of Classification Search
CPC ........ A63F 13/65; A63F 13/216; A63F 13/57; A63F 13/69; A63F 2300/205; A63F 2300/5573; A63F 2300/8082
See application file for complete search history.

(56) References Cited

U.S. PATENT DOCUMENTS 10,646,783 B1    5/2020  Hibbert et al.
11,376,493 B2 *  7/2022  Mullen .................. A63F 13/25
(Continued)

FOREIGN PATENT DOCUMENTS

CN    108763455 A    11/2018
CN    110889872 A     3/2020
(Continued)

OTHER PUBLICATIONS

PCT International Search Report and Written Opinion, PCT Application No. PCT/IB2022/052564, dated Jun. 16, 2022, 11 pages.
(Continued)

*Primary Examiner* — Kevin Y Kim
(74) *Attorney, Agent, or Firm* — Fenwick & West LLP

(57) ABSTRACT

A system provides an augmented reality (AR) experience in a parallel-reality application in which a geography of a virtual world parallels a geography of the real world. The system receives a connection request from a client device and receives a route that the client device traversed in the real world. The route comprises a plurality of locations in the real world. The system determines a plurality of virtual locations to place virtual elements at, where each virtual element corresponds to a location in the real world of the route. The system updates a global state of the AR experience to include the plurality of virtual elements at the plurality of virtual locations. The system provides, to a second client device, AR data including some of the virtual locations for display of some of the virtual elements at the corresponding locations in the real world.

20 Claims, 8 Drawing Sheets

(51) Int. Cl.
  *A63F 13/57*  (2014.01)
  *A63F 13/69*  (2014.01)
(52) U.S. Cl.
  CPC . *A63F 2300/205* (2013.01); *A63F 2300/5573* (2013.01); *A63F 2300/8082* (2013.01)

(56) References Cited

U.S. PATENT DOCUMENTS

| | | |
|---|---|---|
| 2013/0281206 A1 | 10/2013 | Lyons et al. |
| 2016/0133230 A1 | 5/2016 | Daniels et al. |
| 2016/0271492 A1 | 9/2016 | Mullen |
| 2021/0001211 A1 | 1/2021 | Mullen |

FOREIGN PATENT DOCUMENTS

| | | | |
|---|---|---|---|
| JP | 2018-200519 A | 12/2018 | |
| KR | 10-2018-0066369 A | 6/2018 | |
| WO | WO 2017/090274 A1 | 6/2017 | |

OTHER PUBLICATIONS

Taiwan Intellectual Property Office, Office Action, TW Patent Application No. 111111911, dated Oct. 21, 2022, 16 pages.
Japan Patent Office, Office Action, JP Patent Application No. 2021-124796, dated Nov. 8, 2022, six pages.

* cited by examiner

US 11,590,423 B2

MULTI-USER ROUTE TRACKING IN AN AUGMENTED REALITY ENVIRONMENT

BACKGROUND

1. Technical Field

The subject matter described relates generally to augmented reality environments, and in particular to displaying virtual elements along routes of users of an augmented reality experience.

2. Problem

Some existing applications (e.g., fitness trackers) monitor a user's location and may later present location data for the user in a user interface. For example, a jogging application might record GPS coordinates for a wearable device of the user and plot the user's jogging route on a map. However, the map is an abstraction of the real world, and it may be hard for the user to relate the plotted route to their actual experience. Furthermore, the routes plotted on a map generally lack detail, such as which side of a road the user was on, whether the user was on the first or second floor of a building, whether the user went around or over an obstacle, etc.

In parallel reality games, the geography of a virtual world is mapped to at least a portion of the geography of the real world. Players navigate the virtual world by traveling to corresponding portion locations in the real world. Players may view the virtual world via an augmented reality (AR) experience in which virtual elements are overlaid on images of the real world (e.g., on one or more images captured by cameras of devices carried by the players). Multiplayer parallel-reality games can encourage players to get out into the real world and interact (e.g., to achieve cooperative game objectives). However, unless players coordinate their efforts through other channels outside of the game, it can be hard to identify the locations of other players, making the virtual world seem sparsely populated even when there are a relatively large number of players participating. Existing map-based interfaces can provide a player with a general idea where other players are located or have been, but they are disconnected from the AR representation of virtual world with which the players interact.

SUMMARY

The present disclosure describes providing an AR experience in a parallel reality application in which a geography of a virtual world parallels at least a portion of the real world. For instance, an element update system receives a connection request from a client device and receives a route that the client device traversed in the real world. The element update system determines virtual locations at which to place virtual elements based on the route and updates a global state of the AR experience to include virtual elements at the virtual locations. The virtual locations correspond to real-world locations. The element update system provides AR data to a second client device. The AR data includes at least some of the virtual locations for to enable the second client device to display at least some of the virtual elements at the corresponding locations in the real world. The element update system may additionally add more virtual elements or update properties of virtual elements in the virtual world based on routes of other users in the real world.

DETAILED DESCRIPTION

The figures and the following description describe certain embodiments by way of illustration only. One skilled in the art will readily recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

Various embodiments are described in the context of a parallel reality game that includes augmented reality content in a virtual world geography that parallels at least a portion of the real-world geography such that player movement and actions in the real-world affect actions in the virtual world and vice versa. Those of ordinary skill in the art, using the disclosures provided herein, will understand that the subject matter described is applicable in other situations where providing AR data including virtual elements is desirable. In addition, the inherent flexibility of computer-based systems allows for a great variety of possible configurations, combinations, and divisions of tasks and functionality between and among the components of the system. For instance, the systems and methods according to aspects of the present disclosure can be implemented using a single computing device or across multiple computing devices (e.g., connected in a computer network).

Figure 1:
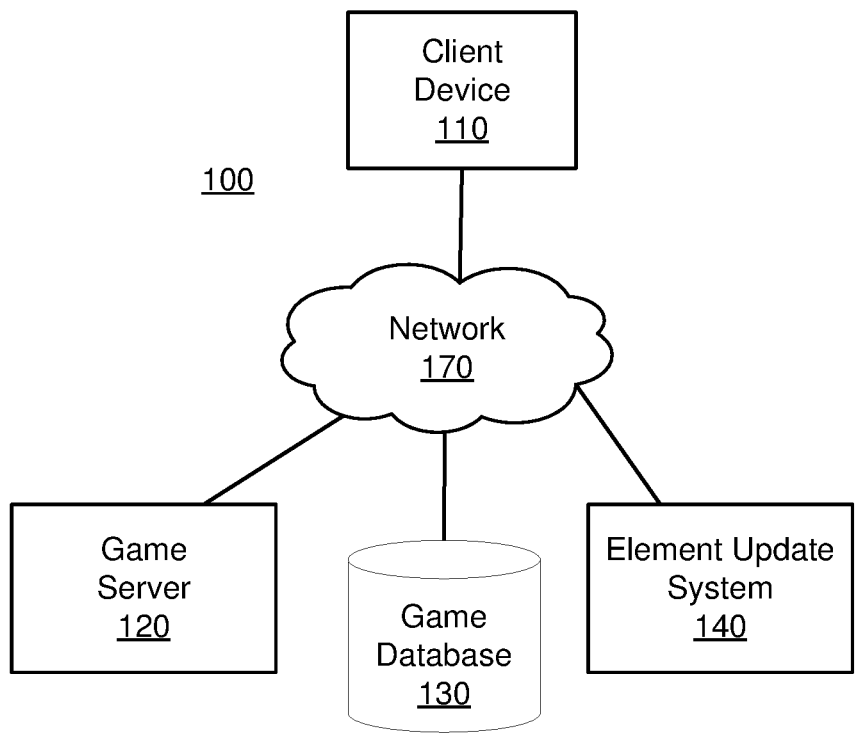
FIG. 1 is a block diagram of a networked computing environment suitable for hosting a parallel reality game, according to one embodiment.

FIG. 1 illustrates one embodiment of a networked computing environment 100 suitable for providing a parallel reality experience, such as a parallel reality game. The networked computing environment 100 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. Typically, the player's position in the real world is determined by finding the location of a client device 110 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real-world location that corresponds to the virtual location of the virtual element in the virtual world. For convenience, various embodiments are described with reference to "the player's location" but one of skill in the art will appreciate that such references may refer to the location of the player's client device 110.

The networked computing environment 100 uses a client-server architecture, where a game server 120 communicates with a client device 110 over a network 170 to provide a parallel reality game to players at the client device 110. The networked computing environment 100 also may include other external systems such as sponsor/advertiser systems or business systems. Although only one client device 110 is illustrated in FIG. 1, any number of clients 110 or other external systems may be connected to the game server 120 over the network 170. Furthermore, the networked computing environment 100 may contain different or additional elements and functionality may be distributed between the client device 110 and the server 120 in a different manner than described below.

A client device 110 can be any portable computing device that can be used by a player to interface with the game server 120. For instance, a client device 110 can be a wireless device, a personal digital assistant (PDA), portable gaming device, cellular phone, smart phone, tablet, navigation system, handheld GPS system, wearable computing device, a display having one or more processors, or other such device. In another instance, the client device 110 includes a conventional computer system, such as a desktop or a laptop computer. Still yet, the client device 110 may be a vehicle with a computing device. In short, a client device 110 can be any computer device or system that can enable a player to interact with the game server 120. As a computing device, the client device 110 can include one or more processors and one or more computer-readable storage media. The computer-readable storage media can store instructions which cause the processor to perform operations. The client device 110 is preferably a portable computing device that can be easily carried or otherwise transported with a player, such as a smartphone or tablet. Various embodiments of the client device 110 are described in greater detail below, with reference to FIG. 2.

The game server 120 can be any computing device and can include one or more processors and one or more computer-readable storage media. The computer-readable storage media can store instructions which cause the processor to perform operations. In various embodiments, the game server 120 maintains a copy of a global game state and manages interactions between client devices 110 of players such that all of the players interact with a consistent game world.

The game server 120 may be configured to receive connection requests from client devices 110. A connection request is an indication that a user of a client device 110 wants to join a parallel reality experience, such as a specific game. The game server 120 may connect the client device 110 to the parallel reality experience. Some or all of the parallel reality experience may involve an AR session in which the game server 120 sends AR data to the client device 110. The AR data may cause the client device 110 to display one or more virtual elements overlaid on a representation of the real world (e.g., one or more images captured by a camera of the client device).

The game server 120 may also be configured to receive other requests for game data from a client device 110 (for instance via remote procedure calls (RPCs)), such as during a parallel reality experience, and to respond to those requests via the network 170. The game data can include information about the virtual world, including additional AR data for updating the virtual elements overlaid over the representation of the real world. The game server 120 can encode game data in one or more data files and provide the data files to the client device 110. In addition, the game server 120 can be configured to receive game data (e.g. player positions, player actions, player input, etc.) from a client device 110 via the network 170. For instance, the client device 110 can be configured to periodically send player input and other updates to the game server 120, which the game server 120 uses to update game data in the game database 130 to reflect any and all changed conditions for the game. Various embodiments of the game server 120 are described in greater detail below, with reference to FIG. 3.

The game server 120 can include or can be in communication with a game database 130. The game database 130 stores game data used in the parallel reality game to be served or provided to the client device(s) 110 over the network 170. The game data stored in the game database 130 can include: (1) data associated with the virtual world in the parallel reality game (e.g. imagery data used to render the virtual world on a display device, geographic coordinates of locations in the virtual world, etc.); (2) data associated with players of the parallel reality game (e.g. player profiles including but not limited to player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated with virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real world objects, landmarks, positions linked to virtual world elements (e.g. location of real world objects/landmarks, description of real world objects/landmarks, relevance of virtual elements linked to real world objects, etc.); (6) Game status (e.g. current number of players, current status of game objectives, player leaderboard, etc.); (7) data associated with player actions/input (e.g. current player positions, past player positions, player moves, player input, player queries, player communications, etc.); and (8) any other data used, related to, or obtained during implementation of the parallel reality game. The game data stored in the game database 130 can be populated either offline or in real time by system administrators or by data received from users/players of the game, such as from a client device 110 over the network 170.

The game server 120 may include or be in connection with the element update system 140. The element update system 140 receives location data from client devices 110 as the client devices 110 traverse routes in the real world and requests for game data from the game server 120 (or, in some embodiments, directly from client devices 110). The element update system 140 uses the location data of the routes to determine corresponding virtual locations and update the global state of the parallel reality game to include virtual elements at the virtual locations. The element update system 140 may additionally update properties of the virtual elements or add more virtual elements of various types to the virtual world based on movement of the client devices 110 (as determined from the location data). Various embodiments of the element update system 140 are described in greater detail below, with reference to FIG. 4.

The network 170 can be any type of communications network, such as a local area network (e.g. intranet), wide area network (e.g. Internet), or some combination thereof. The network can also include a direct connection between a client device 110 and the game server 120. In general, communication between the game server 120 and a client device 110 can be carried via a network interface using any type of wired or wireless connection, using a variety of communication protocols (e.g. TCP/IP, HTTP, SMTP, FTP), encodings or formats (e.g. HTML, XML, JSON), or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

In addition, in situations in which the systems and methods discussed herein access and analyze personal information about users, or make use of personal information, such as location information, the users may be provided with an opportunity to control whether programs or features collect the information and control whether or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Figure 2:
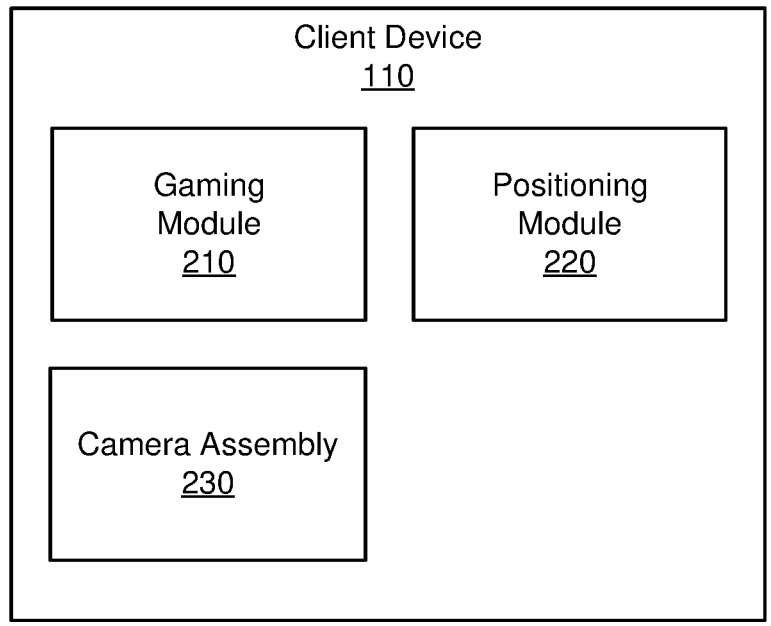
FIG. 2 is a block diagram of the client device of FIG. 1, according to one embodiment.

FIG. 2 illustrates one embodiment of a client device 110. In the embodiment shown, the client device 110 includes a gaming module 210, a positioning module 220, and a camera assembly 230. In other embodiments, a client device 110 may include different or additional elements. Furthermore, the functionality may be distributed among the elements in different way than described.

The gaming module 210 provides a player with an interface to participate in the parallel reality game. The game server 120 transmits game data over the network 170 to the client device 110 for use by the gaming module 210 to provide local versions of the game to players at locations remote from the game server 120. In one embodiment, the gaming module 210 presents a user interface on a display device associated with the client device 110 that displays a virtual world (e.g. renders imagery of the virtual world) associated with the game and allows a user to interact in the virtual world to perform various game objectives. In some embodiments, the gaming module 210 presents image data from the real world (e.g., captured by the camera assembly 230) augmented with virtual elements from the parallel reality game. In these embodiments, the gaming module 210 may generate virtual content or adjust virtual content according to other information received from other components of the client device 110. For example, the gaming module 210 may adjust a virtual object to be displayed on the user interface according to a depth map of the scene captured in the image data (e.g., as generated by a depth estimation model).

The gaming module 210 can also control various other outputs to allow a player to interact with the game without requiring the player to view a display screen. For instance, the gaming module 210 can control various audio, vibratory, or other notifications that allow the player to play the game without looking at the display screen. The gaming module 210 can access game data received from the game server 120 to provide an accurate representation of the game to the user. The gaming module 210 can receive and process player input and provide updates to the game server 120 over the network 170. The gaming module 210 may also generate or adjust game content to be displayed by the client device 110. For example, the gaming module 210 may generate a virtual element based on depth information (e.g., as determined by a depth estimation model applied to one or more images captured by the camera assembly 230).

The positioning module 220 can be any device or circuitry for monitoring the position of the client device 110. For example, the positioning module 220 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, based on IP address, by using triangulation or proximity to cellular towers or Wi-Fi hotspots, or other suitable techniques for determining position. The positioning module 220 may further include various other sensors that may aid in accurately positioning the client device 110 location. In some embodiments, a coarse location is determined using a first location determination technique (e.g., using a GPS system) and the positioning module 220 obtains a 3D map of the vicinity of the client device 110 using the coarse location. A positioning module 220 may determine a more precise location of the client device 110 using a localization technique with the 3D map, such as comparing images captured by the camera assembly 230 to the 3D map to determine the position and orientation of the client device 110.

As the player moves around with the client device 110 in the real world, the positioning module 220 tracks the position of the player and provides the player position information to the gaming module 210. The gaming module 210 updates the player position in the virtual world associated with the game based on the actual position of the player in the real world. Thus, a player can interact with the virtual world simply by carrying or transporting the client device 110 in the real world. In particular, the location of the player in the virtual world can correspond to the location of the player in the real world. The gaming module 210 can provide player position information to the game server 120 over the network 170. In response, the game server 120 may enact various techniques to verify the client device 110 location to prevent cheaters from spoofing the client device 110 location. It should be understood that location information associated with a player is utilized only if permission is granted after the player has been notified that location information of the player is to be accessed and how the location information is to be utilized in the context of the game (e.g. to update player position in the virtual world). In addition, any location information associated with players will be stored and maintained in a manner to protect player privacy.

The camera assembly 230 includes one or more cameras configured to capture images of the physical environment in which the client device 110 is located. The portion of the physical environment depicted in an image is referred to as a scene. The camera assembly 230 captures image data corresponding to the scene and stores it in a storage medium of the client device. Additionally or alternatively, the image data may be sent to the game server 120 via the network 170. The camera assembly 230 may utilize a variety of varying photo sensors with varying color capture ranges at varying capture rates. The camera assembly 230 may contain a wide-angle lens or a telephoto lens. The camera assembly 230 may be configured to capture single images or video as the image data. The client device 110 may also include other sensors for recording data about the client device's physical environment, such as accelerometers, gyroscopes, inertial measurement units (IMUs), barometers, thermometers, light sensors, microphones, etc. The image data can be appended with metadata describing other details of the image data including sensory data (e.g. temperature, brightness of environment) or capture data (e.g. exposure, warmth, shutter speed, focal length, capture time, etc.).

Figure 3:
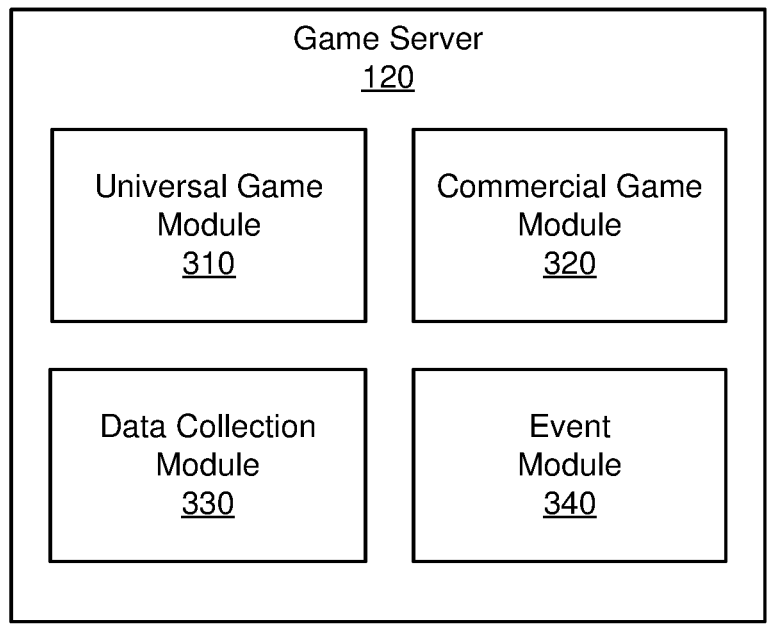
FIG. 3 is a block diagram of the game server of FIG. 1, according to one embodiment.

FIG. 3 illustrates one embodiment of the game server 120. In the embodiment shown, the game server 120 includes a universal gaming module 310, a commercial game module 320, a data collection module 330, and an event module 340. As mentioned above, the game server 120 interacts with a game database 130 that may be part of the game server 120 or accessed remotely (e.g., the game database 130 may be a distributed database accessed via the network 170). In other embodiments, the game server 120 contains different or additional elements. In addition, the functions may be distributed among the elements in a different manner than described. For instance, the game database 130 can be integrated into the game server 120.

The universal game module 310 hosts the parallel reality game for all players and acts as the authoritative source for the current status of the parallel reality game for all players. As the host, the universal game module 310 generates game content for presentation to players, e.g., via their respective client devices 110. The universal game module 310 may access the game database 130 to retrieve or store game data when hosting the parallel reality game. The universal game module 310 also receives game data from client device 110 (e.g. depth information, player input, player position, player actions, landmark information, etc.) and incorporates the game data received into the overall parallel reality game for all players of the parallel reality game. The universal game module 310 can also manage the delivery of game data to the client device 110 over the network 170. The universal game module 310 may also govern security aspects of client device 110 including but not limited to securing connections between the client device 110 and the game server 120, establishing connections between various client device 110, and verifying the location of the various client device 110.

The commercial game module 320, in embodiments where one is included, can be separate from or a part of the universal game module 310. The commercial game module 320 can manage the inclusion of various game features within the parallel reality game that are linked with a commercial activity in the real world. For instance, the commercial game module 320 can receive requests from external systems such as sponsors/advertisers, businesses, or other entities over the network 170 (via a network interface) to include game features linked with commercial activity in the parallel reality game. The commercial game module 320 can then arrange for the inclusion of these game features in the parallel reality game.

The data collection module 330, in embodiments where one is included, can be separate from or a part of the universal game module 310. The data collection module 330 can manage the inclusion of various game features within the parallel reality game that are linked with a data collection activity in the real world. For instance, the data collection module 330 can modify game data stored in the game database 130 to include game features linked with data collection activity in the parallel reality game. The data collection module 330 can also analyze and data collected by players (e.g., as part of a crowd-sourcing effort) and provide the data for access by various platforms. To provide a specific example, players may be prompted to submit photographs of landmarks and other features of interest in their environment and the data collection module 330 may incorporate virtual elements corresponding to the real-world landmarks or features into the parallel reality game based on player submissions (e.g., subject to verifying that the landmark exists and is located where the submitting player indicated).

The event module 340 manages player access to events in the parallel reality game. Although the term "event" is used for convenience, it should be appreciated that this term need not refer to a specific event at a specific location or time. Rather, it may refer to any provision of access-controlled game content where one or more access criteria are used to determine whether players may access that content. Such content may be part of a larger parallel reality game that includes game content with less or no access control or may be a stand-alone, access controlled parallel reality game.

Figure 4:
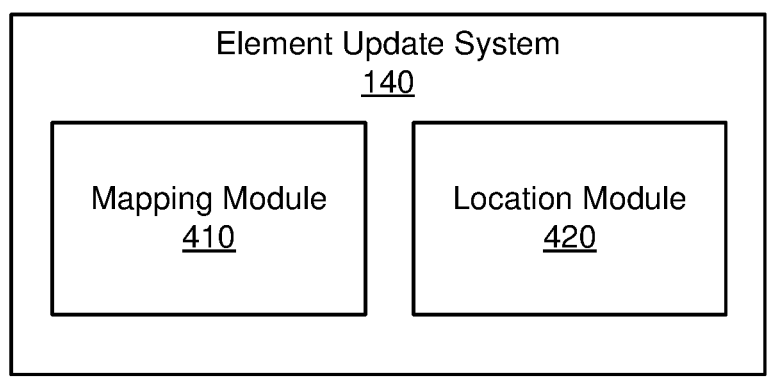
FIG. 4 is a block diagram of the element update system of FIG. 1, according to one embodiment.

FIG. 4 illustrates one embodiment of the element update system 140, which is configured to add virtual elements to the virtual world based on location data received from client devices 110. In the embodiment shown, the element update system 140 includes a mapping module 410 and a location module 420. In other embodiments, the element update system 140 contains different or additional elements/modules. In addition, the functions may be distributed among the elements/modules in a different manner than described.

The mapping module 410 receive locations of client devices 110 each connected to a parallel reality experience. In some embodiments, the mapping module 410 receives locations directly from each client device 110, where the locations are GPS coordinates captured by the client device 110. In other embodiments, the mapping module 410 receives locations from the game server 120. In some embodiments, the received locations may comprise a route of the client device 110 that is sent to the mapping module 410. In other embodiments, the mapping module 410 determines a route a client device 110 traversed in the real world based on the received locations. For instance, the mapping module 410 may record the locations received from a client device 110 within a time period as a route of the client device. In another instance, the mapping module 410 may record a route of the client device as any location received from the client device 110 while the client device 110 is connected the game server 120 for a particular parallel reality experience. In this instance, the mapping module 410 may store in the game database 130 one continuous route of the client device's movement whenever the client device 110 is connected to the parallel reality experience, one route with gaps based on instances when the client device 110 was not connected to the parallel reality experience, or multiple routes, each representing the movement of the client device when the client device 110 was connected to the parallel reality experience. Further, the mapping module 410 may begin storing a route for a client device 110 upon receiving a first location of the client device 110 as the client device 110 connects to the parallel reality experience. Upon receiving a new location of the client device in real-time (e.g., within 1-2 second but not more than 10 seconds), the mapping module 410 may update the route to include the new location in the game database 130.

For each route, the mapping module 410 accesses the game database 130 to retrieve data associated with the virtual world corresponding to locations in the real world of the route. Based on the retrieved data, the mapping module 410 determines virtual locations at which to place virtual elements at in the global state of the parallel reality experience stored at the game database 130. For instance, the mapping module 410 may map each of the locations in the real world to a corresponding virtual location in the virtual world such that the virtual location is associated with GPS coordinates of the location. In other embodiments, the mapping module 410 selects a subset of the locations in the real world to map to virtual locations. For instance, the subset may be a random set of the locations in the real world, every other location in the route, or another pattern of the locations in the route (e.g., one in a sequence of five real world locations).

For each of the determined virtual locations, the mapping module 410 updates the global state of the parallel reality experience in the game database 130 to include a virtual element at the virtual location. In some embodiments, the mapping module 410 all of the virtual elements are the same. In other embodiments, the mapping module 410 may access to game database 130 to retrieve a type of virtual element associated with a user profile of a user of the client device 110 or determine a currently selected type of virtual element (e.g., selected by the user from a menu) and updates the global state to include a virtual element of the type to each virtual location. For example, the virtual elements may be representations of flowers, and different client devices 110 connected to the parallel reality experience may be associated with different representations of a flower (e.g., a different type of flower), which the mapping module 410 adds to virtual locations corresponding to a route of each client device 110. The mapping module 410 may continue to update the global state to include virtual elements at virtual locations as the mapping module 410 receives locations that one or more client devices 110 traversed during a parallel reality experience. The updating may occur in real-time, such that the mapping module 410 updates the global state to include a virtual element within a short time period (e.g., 1-2 seconds) after receiving a corresponding location in the real world from the client device 110 or game server 120.

The location module 420 determines if client devices 110 are located at locations in the real world that correspond to virtual locations near one or more virtual elements. In particular, the location module 420 receives locations of client devices 110 connected to a parallel reality experience. The location module 420 may receive the locations in real-time or periodically. For each received location, the location module 420 determines a virtual location corresponding to the location of the client device 110. The location module 420 accesses the game database 130 to retrieve virtual locations of virtual elements of the parallel reality experience, such as virtual elements added by the mapping module 410 based on routes traversed by one or more client devices 110.

The location module 420 compares the corresponding virtual location to the virtual locations of the virtual elements to determine if the corresponding virtual location is within a threshold distance to one or more of the virtual elements. The threshold distance may be standard for the parallel reality experience, may be set by an external operator of the game server 120, or may be based on the location of the virtual element. For example, if the virtual element is located at a virtual location corresponding to a bridge in the real world, the location module 420 may use the border of the bridge for determining a plurality of threshold distances to directionally compare the corresponding virtual location to.

If the location module 420 determines that the corresponding virtual location is within a threshold distance of one or more of the virtual elements, the location module 420 may generate AR data identifying the virtual elements that is sent to the client device 110 to cause it to display the visual representations of the virtual elements. Further, the location module 420 may change a property of the virtual elements. For instance, the location module 420 may increase or decrease a growth rate of the virtual elements (e.g., representations of flowers), change colors of the virtual elements, or otherwise alter the appearance of the virtual elements. The location module 420 may send updated AR data indicating the modified property of the virtual elements directly to the client device 110 or send an indication to the game server 120 to update the global state of the game and provide updated game data to the client device 110. This is further described with respect to FIG. 5C.

Additionally, the location module 420 may add one or more new virtual elements near the corresponding virtual location upon determining that the corresponding virtual location is within the threshold distance to the one or more virtual elements. The location module 420 may add, to the global state of the parallel reality experience stored in the game database 130, one or more new virtual elements next to the corresponding virtual location or at a predetermined distance from the corresponding virtual location. Further, the one or more new virtual elements may be of the same type as the one or more virtual elements or may be determined based on the type of the one or more virtual elements and a type associated with the client device 110. For instance, the game database 130 may store associations between pairs of types of virtual elements and a resulting type of virtual element, which the location module 420 may retrieve when adding virtual elements to the global state. This concept is further described in relation to FIG. 5D. The location module 420 may send an indication to the game server 120 to send the updated global state to the client device 110 for display.

In some embodiments, the location module 420 may only compare the corresponding location to virtual locations of virtual elements not associated with the user of the client device 110 of the corresponding virtual location. For instance, if a virtual element is within a threshold distance but was placed at the virtual location by the mapping module 410 based on the client device's previous movement, the location module 420 may not take action based on the virtual location of the virtual element relative to the corresponding virtual location (e.g., not send an indication to the game server 120, add one or more virtual elements, or change a property of the virtual element). In another example, if the virtual element is of the same type as a type associated with the user (e.g., for representations of flowers, the type of the virtual element and type associated with the user are both sunflowers), the location module 420 may also not take action with respect to the virtual element.

Exemplary Parallel Reality Game

Figure 5A:
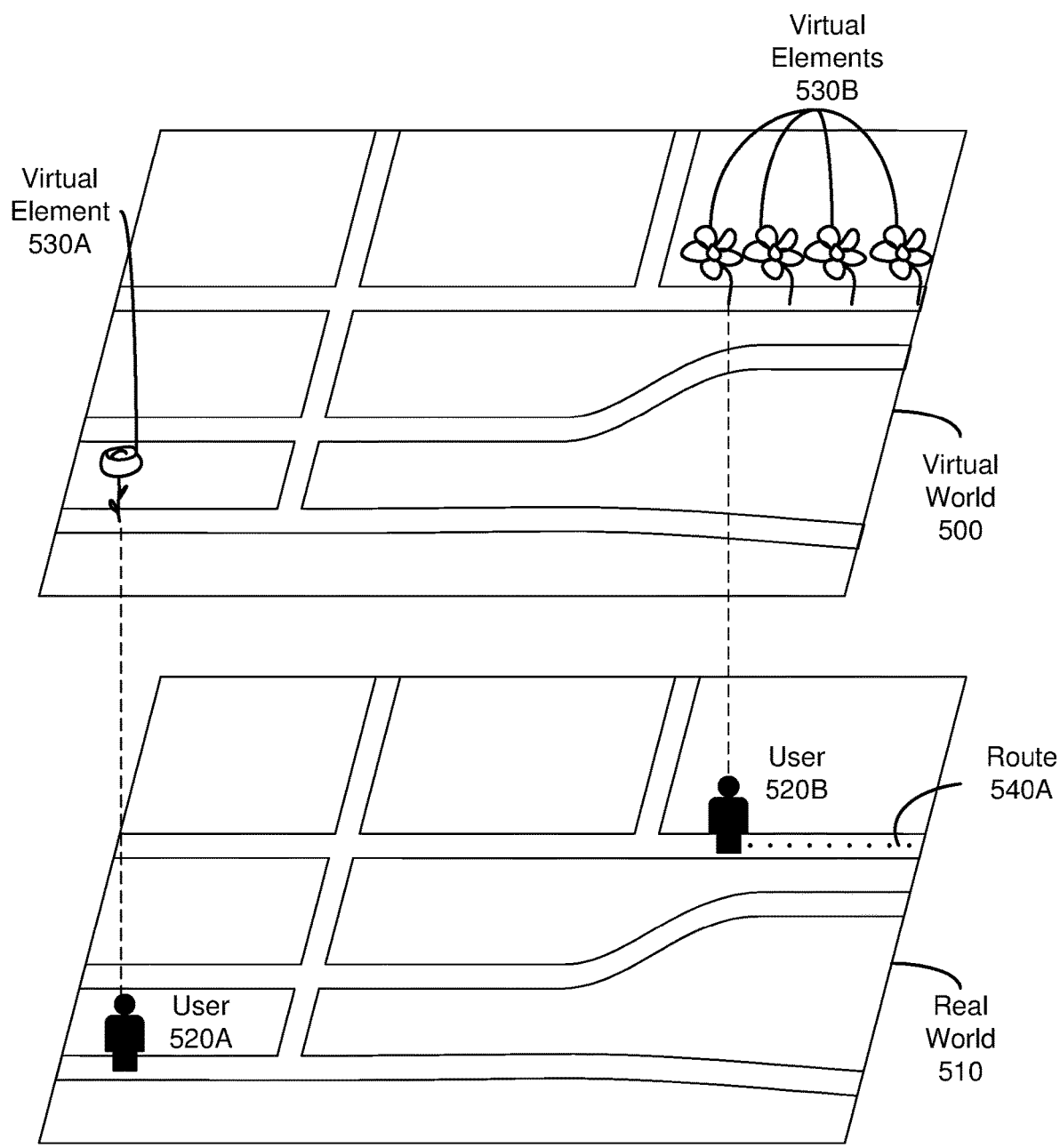
FIG. 5A depicts a representation of a virtual world having a geography that parallels the real world, according to one embodiment.

FIGS. 5A-5D depict a representation of a virtual world 500 having a geography that parallels the real world 510, according to one embodiment. In particular, FIG. 5A depicts two users 520 of client devices 110 connected to a parallel reality experience. The users 520 are located in the real world 510 at different locations, which each correspond to a virtual element 530 in the virtual world. For instance, user 520A is located at a location in the real world 510 that corresponds to the virtual location of virtual element 530A, which is a rose. User 520B is at a location in the real world 510 that corresponds to a virtual element 530B, which is a daisy. The rose is a first type of virtual element 530A, which may be associated with user 520A, who may have selected or been assigned the first type. The daisy is a second type of virtual element 530B, which may have been selected by or assigned to user 520B.

User 520B is associated with a route 540A in the real world 510 that the user traversed while their client device 110 was connected to the parallel reality experience. Thus, the virtual world 500 includes virtual elements 530B corresponding to the route 540A. In contrast, user 520A may have sent a connection request to connect to the parallel reality experience from their location shown in FIG. 5A, so user 520A is only associated with a single virtual element 530A corresponding to their current location and not the route they took before connecting to the parallel reality experience.

Figure 5B:
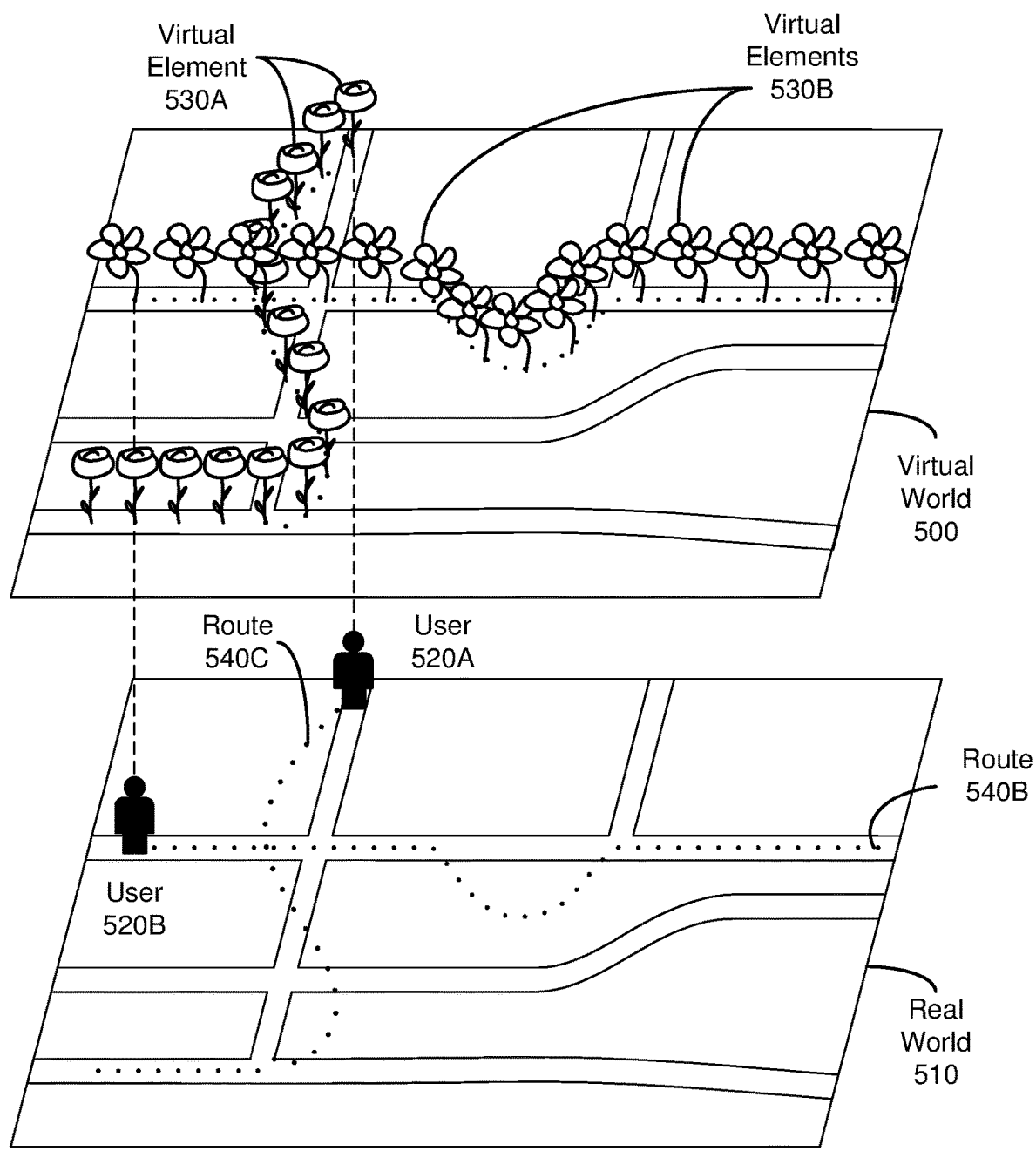
FIG. 5B depicts routes of users with client devices in a virtual world, according to one embodiment.

In FIG. 5B, the users 520 have both moved in the real world 510 while connected to the parallel reality experience via their client devices 110. User 520A has traversed route 540C, and the mapping module 410 added virtual elements 530A of the first type (e.g., roses) at virtual locations corresponding to the route 540C in the virtual world 500. User 520B has traversed route 540B, which is an extension of route 540A, and the mapping module 410 has similarly added virtual elements 530B of the second type (e.g., daisies) to virtual locations corresponding to the route 540B in the virtual world 500. Further, the mapping module 410 mapped the virtual elements to locations corresponding to the actual routes 540 the user took, rather than mapping the virtual elements to similar locations on a grid in the virtual world 500.

The game server 120 may send AR data including one or more of the virtual elements to the client devices 110 of the users 520. For example, the if user 520A points a camera of their client device 110 towards the route 540C, the user 520A may see, via a display of the client device 110, the virtual elements 530A lining their route. In addition, if user 520B has already passed the route 540C of user 520A, as shown in FIG. 5B, user 520A may additionally see virtual elements 530B lining the route 540B of user 520B on the display.

Figure 5C:
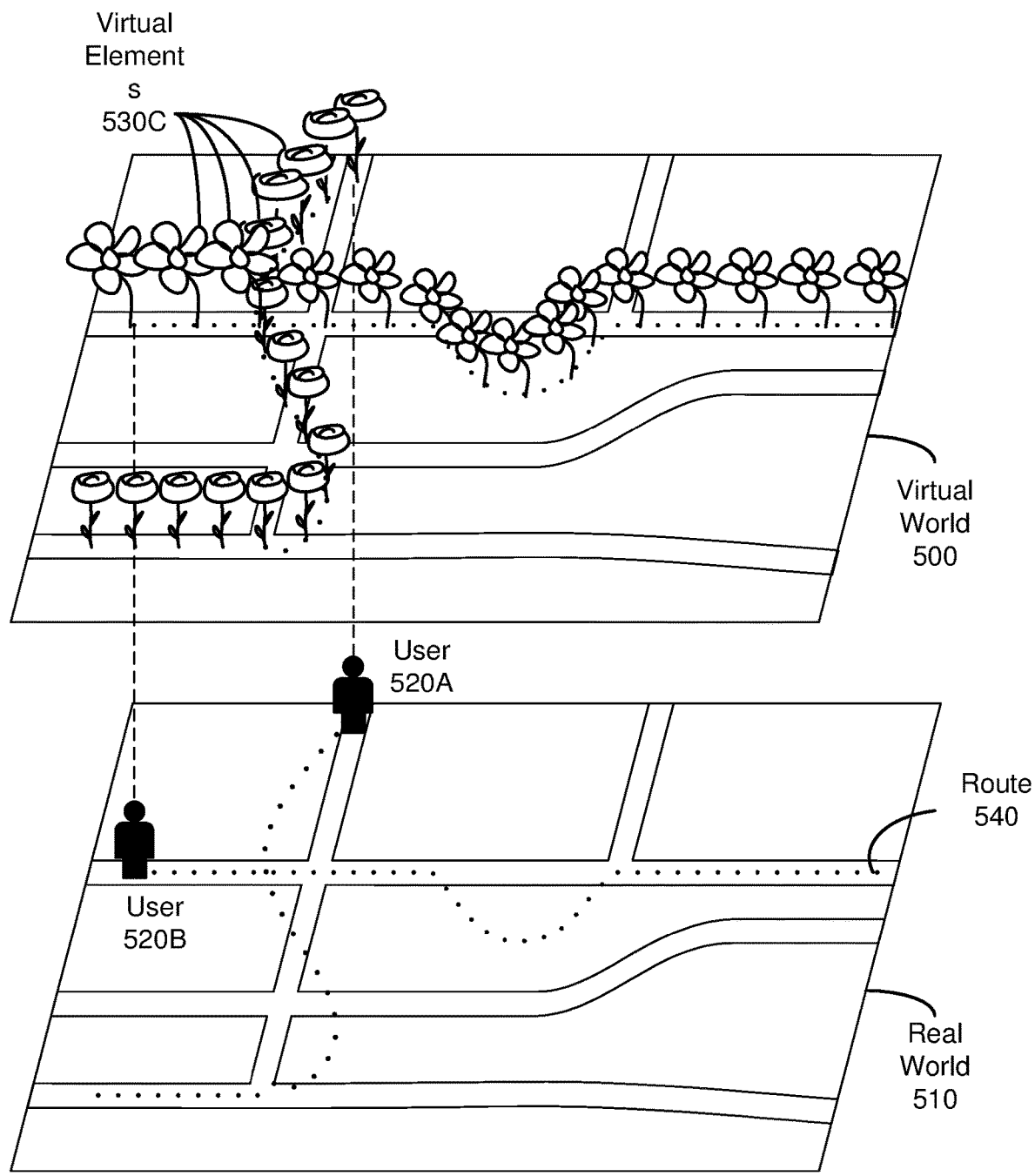
FIG. 5C depicts a representation of virtual elements with an increased growth rate, according to one embodiment.

In FIG. 5C, the location module 420 has determined that one or more virtual elements 530 are within a threshold distance of one another. The location module 420 updated a growth rate of the one or more virtual elements such that the virtual elements are depicted in the virtual world 500 as being at an increased size than other virtual elements 530 in the virtual world 500. As shown in FIG. 5C, the location module 420 may only increase the size (also referred to as growth rate) of the virtual elements 530C once the routes 540 of the users 520 has crossed. However, in other embodiments, the location module 420 may increase the growth rate of any virtual elements 530 within the threshold distance or may increase the growth rate of any virtual elements associated with a user 520A once the user 520A has crossed a path of another user 520B.

Figure 5D:
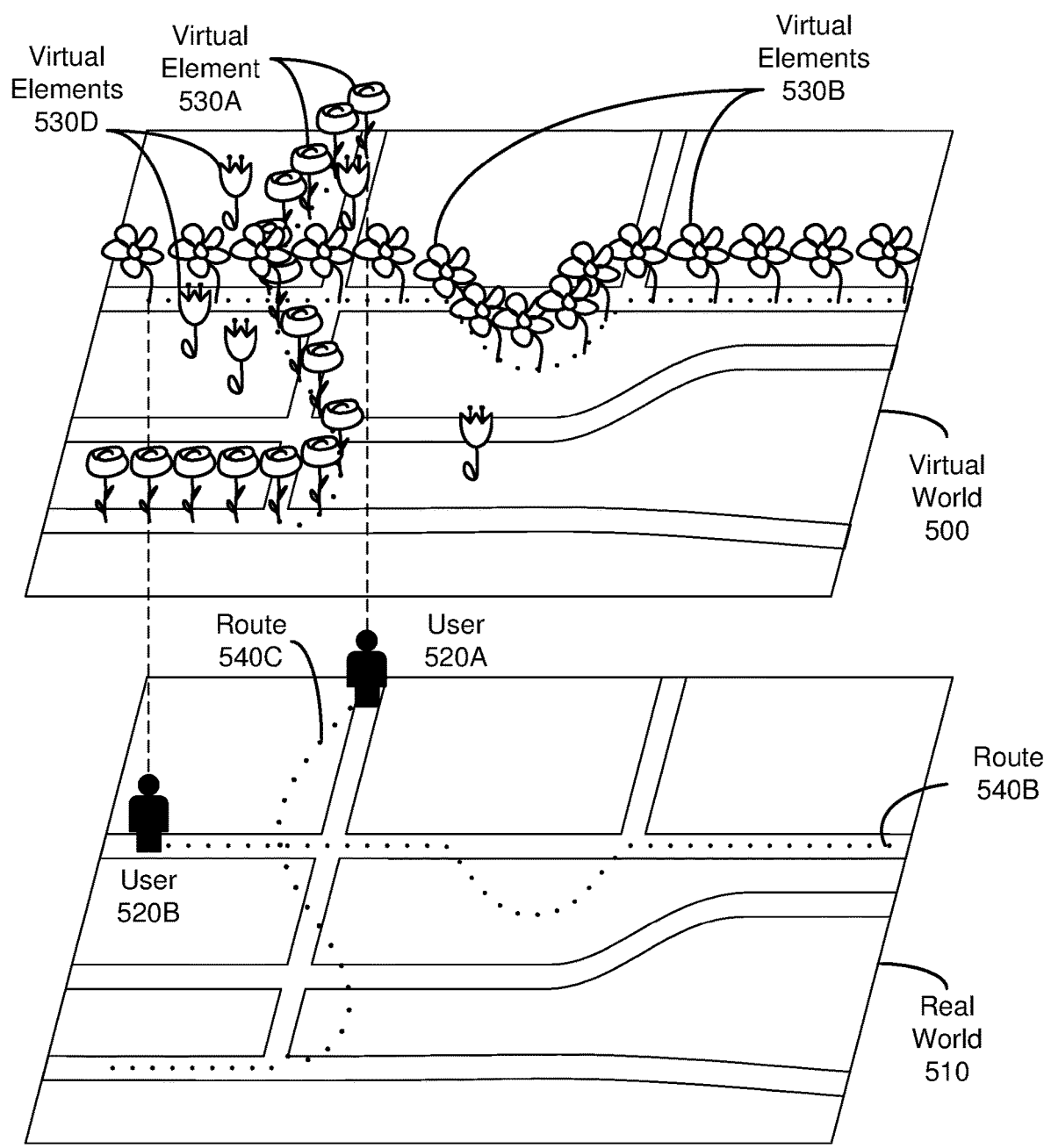
FIG. 5D depicts a representation a third type of virtual element placed in the virtual world based on a first and second type of virtual element being within a threshold distance of one another, according to one embodiment.

In FIG. 5D, the location module 420 has determined that one or more virtual elements 530 are within a threshold distance of one another. In response, the location module 420 added more virtual elements 530D to the virtual world 500 near the virtual elements 530 of the two routes 540. The added virtual elements 530D are of a third type (e.g., tulips), and adding the virtual elements 530D may be referred to as cross pollinating. The location module 420 may determine the third type of virtual element 530D based on the first and second type of virtual elements 530. For instance, cross pollinating roses and daisies may cause the location module 420 to select tulips, as show in FIG. 5D, whereas cross pollinating tulips and roses may cause the location module 420 to select chrysanthemums. The specific types selected by the location module 420 may be stored in the game database 130 is association with pairs of types that, when located within the threshold distance from one another in the virtual world 500, cause the location module 420 to select the specific type.

Virtual Element Placement Process

Figure 6:
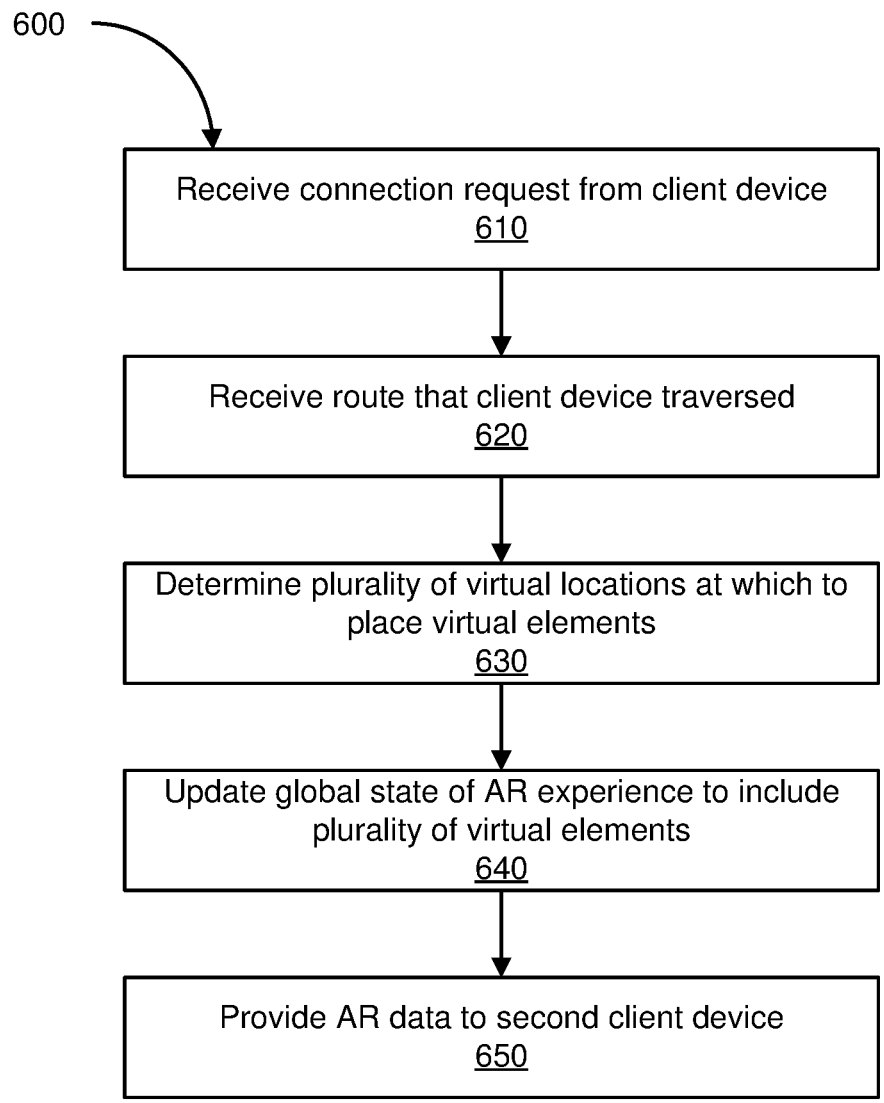
FIG. 6 depicts a flowchart illustrating a process for providing AR data to a client device, according to one embodiment.

FIG. 6 depicts a flowchart illustrating a process 600 for providing AR data to a client device, according to one embodiment. In particular, the game server 120 receives 610 a connection request from a client device 110 for connecting to an AR experience. The game server 120 may provide AR data from the game database 130 for the AR experience the client device 110, where the AR data may represent the virtual world corresponding to the real world around the client device 110. In some embodiments, the mapping module 410 may receive an indication of the connection request from the game server 120 or may receive location data captured by the client device 110 from the game server 120. The mapping module 410 receives 620, from the location data, a route that the client device 110 traversed in the real world. The route comprises locations in the real world, which may each be represented by GPS coordinates. In some embodiments, the mapping module 410 may receive locations of the client device 110 in the real world captured in real-time (e.g., within 1-2 seconds of the client device 110 being located at the locations) and may determine the route of the client device 110 based on the received locations.

The mapping module 410 determines 630 virtual locations at which to place virtual elements based on the route. Each of the virtual locations corresponds to a location in the real world of the route. The mapping module 410 updates 640 the global state of the AR experience in the game database 130 to include the virtual elements at the virtual locations corresponding to the route. In some embodiments, the mapping module 410 may determine a type of virtual element associated with the user of the client device 110 and update the global state with virtual elements of that type. In some instances, the mapping module 410 may update the global state to include each virtual element in real-time responsive to receiving an indication from the client device 110 that the client device 110 is located at the location in the real world corresponding to the virtual location of the route. The game server 120 provides 650 AR data from the game database 130 including one or more of the virtual elements at the virtual locations to a second client device for display at corresponding locations in the real world.

In some embodiments, the location module 420 receives a current location of a second client device 110 that is being provide with the same AR experience as the client device 110. The location module 420 may determine that the second client device 110 is within a threshold distance of the route (e.g., one or more locations in the real world of the route in the real world). Responsive to determining that the second client device 110 is within a threshold distance of the route, the location module 420 may send an indication to the game server 120 to send AR data the second client device 110, where the AR data includes one or more virtual elements corresponding to the route. In some embodiments, the location module 420 may change a property of one or more of the virtual elements responsive to determining that the second client 110 is within a threshold distance of the route. For example, if the virtual elements are representations of flowers, the location module 420 may increase a growth speed of the virtual elements such that one or more of the virtual elements grow larger as the client device 110 moves in the real world.

In some embodiments, where the virtual elements are of a first type, the location module 420 may determine that one or more of the first type of virtual elements are within a threshold distance of one or more virtual elements of a second type. The second type of virtual elements may be mapped to a second route in the real world that was traversed by a second client device 110. Alternatively, the second type of virtual elements may have been placed by the game server 120 at virtual locations corresponding to the virtual world around the route for portions the AR experience (e.g., visual effects, minigames, etc.). The location module 420 may generate a one or more virtual elements of a third type to add to the virtual world based on the first and second types of virtual element. The location module 420 may add the third type of virtual elements to the global state such that the game server 120 may send AR data including one or more of the third type of virtual elements for display to client devices 110 that are near corresponding locations in the real world.

Those of ordinary skill in the art, using the disclosures provided herein, will appreciate that numerous game interface configurations and underlying functionalities will be apparent in light of this disclosure. The present disclosure is not intended to be limited to any one particular configuration.

Example Computing System

Figure 7:
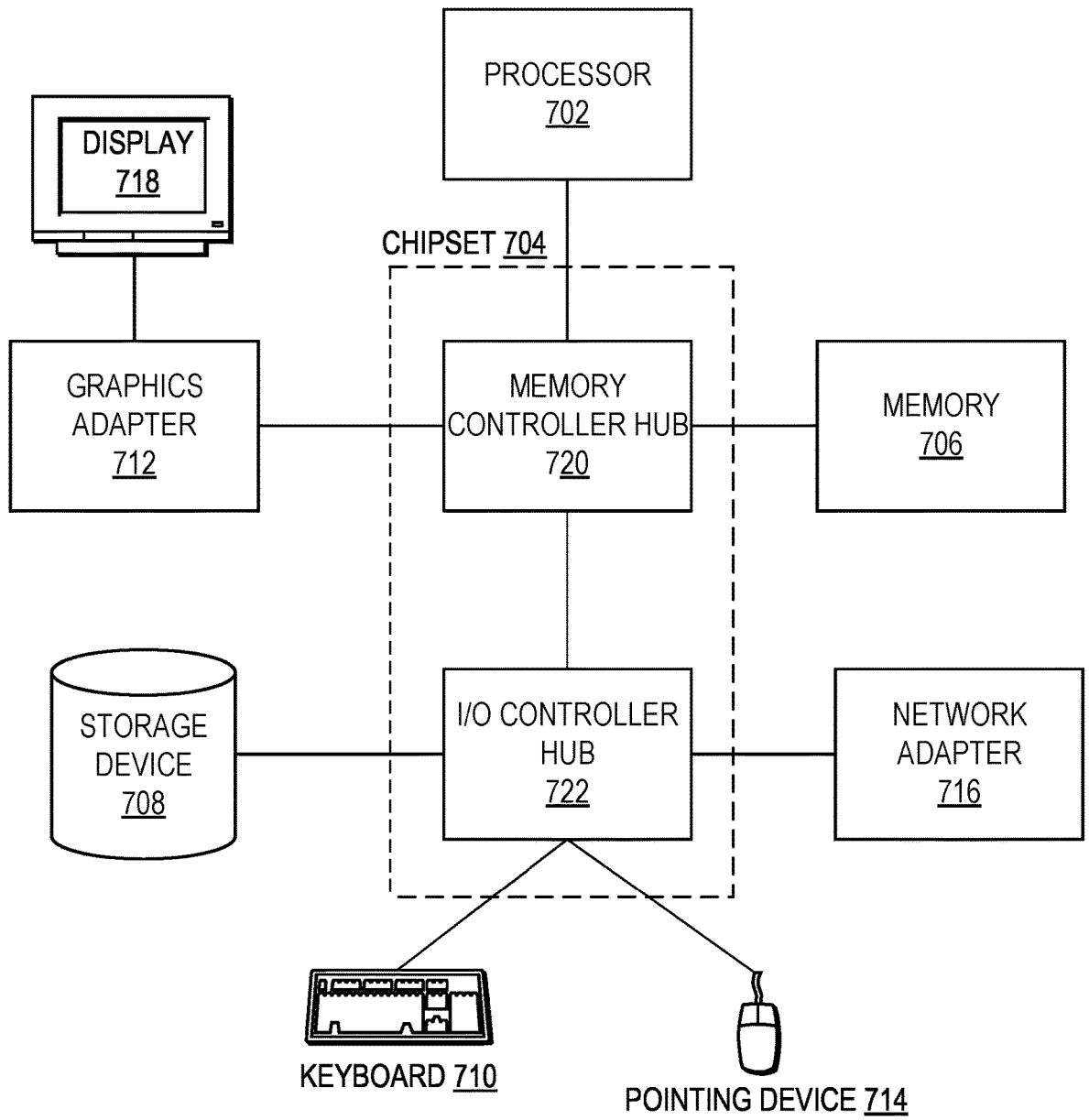
FIG. 7 illustrates an example computer system suitable for use in the networked computing environment of FIG. 1, according to one embodiment.

FIG. 7 is an example architecture of a computing device, according to an embodiment. Although FIG. 7 depicts a high-level block diagram illustrating physical components of a computer used as part or all of one or more entities described herein, in accordance with an embodiment, a computer may have additional, less, or variations of the components provided in FIG. 7. Although FIG. 7 depicts a computer 700, the figure is intended as functional description of the various features which may be present in computer systems than as a structural schematic of the implementations described herein. In practice, and as recognized by those of ordinary skill in the art, items shown separately could be combined and some items could be separated.

Illustrated in FIG. 7 are at least one processor 702 coupled to a chipset 704. Also coupled to the chipset 704 are a memory 706, a storage device 708, a keyboard 710, a graphics adapter 712, a pointing device 714, and a network adapter 716. A display 718 is coupled to the graphics adapter 712. In one embodiment, the functionality of the chipset 704 is provided by a memory controller hub 720 and an I/O hub 722. In another embodiment, the memory 706 is coupled directly to the processor 702 instead of the chipset 704. In some embodiments, the computer 700 includes one or more communication buses for interconnecting these components. The one or more communication buses optionally include circuitry (sometimes called a chipset) that interconnects and controls communications between system components.

The storage device 708 is any non-transitory computer-readable storage medium, such as a hard drive, compact disk read-only memory (CD-ROM), DVD, or a solid-state memory device or other optical storage, magnetic cassettes, magnetic tape, magnetic disk storage or other magnetic storage devices, magnetic disk storage devices, optical disk storage devices, flash memory devices, or other non-volatile solid state storage devices. Such a storage device 708 can also be referred to as persistent memory. The pointing device 714 may be a mouse, track ball, or other type of pointing device, and is used in combination with the keyboard 710 to input data into the computer 700. The graphics adapter 712 displays images and other information on the display 718. The network adapter 716 couples the computer 700 to a local or wide area network.

The memory 706 holds instructions and data used by the processor 702. The memory 706 can be non-persistent memory, examples of which include high-speed random access memory, such as DRAM, SRAM, DDR RAM, ROM, EEPROM, flash memory.

As is known in the art, a computer 700 can have different or other components than those shown in FIG. 13. In addition, the computer 700 can lack certain illustrated components. In one embodiment, a computer 700 acting as a server may lack a keyboard 710, pointing device 714, graphics adapter 712, or display 718. Moreover, the storage device 708 can be local or remote from the computer 700 (such as embodied within a storage area network (SAN)).

As is known in the art, the computer 700 is adapted to execute computer program modules for providing functionality described herein. As used herein, the term "module" refers to computer program logic utilized to provide the specified functionality. Thus, a module can be implemented in hardware, firmware, or software. In one embodiment, program modules are stored on the storage device 708, loaded into the memory 706, and executed by the processor 302.

Additional Considerations

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for displaying travel paths of users in an augmented reality application. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by the following claims.

We claim:

1. A method for providing an augmented reality (AR) experience in a parallel-reality application in which a geography of a virtual world parallels a geography of at least a portion of a real world, the method comprising: receiving a connection request from a client device;
   receiving a route that the client device traversed in the real world, the route comprising a plurality of locations in the real world;
   determining a plurality of virtual locations at which to place virtual elements, each virtual location corresponding to one of the locations in the real world of the route;
   updating a global state of the AR experience to include the plurality of virtual elements at the plurality of virtual locations; and
   providing, to a second client device, AR data that causes the second client device to display at least some of the virtual elements at at least some of the virtual locations corresponding to at least some of the locations in the real world.

2. The method of claim 1, wherein each of the plurality of virtual elements are included in the global state at the virtual location in real-time responsive to receiving an indication from the client device that the client device is located at the location in the real world corresponding to the virtual location of the route.

3. The method of claim 1, wherein each of the plurality of locations in the real world is represented by global positioning system coordinates.

4. The method of claim 1, wherein providing the AR data to the second client device comprises:
   receiving a current location of the second client device; and
   subsequent to determining that the second client device is within a threshold distance of the route, providing, to the second client device, the AR data for display.

5. The method of claim 1, further comprising:
   determining a type of virtual element associated with a user of the client device, wherein each of the plurality of virtual elements are of the type associated with the user.

6. The method of claim 1, wherein the plurality of virtual elements are of a first type, the method further comprising:
   determining that one or more of the plurality of virtual elements are within a threshold distance of one or more of a second plurality of virtual elements mapped to virtual locations corresponding to a second route in the real world, the second route traversed by the second client device or a third client device, wherein the second plurality of virtual elements is of a second type; and
   generating a third plurality of virtual elements of a third type, wherein the third type is selected from a plurality of possible types based on the first type and the second type.

7. The method of claim 1, further comprising: subsequent to determining that the second client device or a third client device is within a threshold distance of one or more of the plurality of virtual elements, changing a property of the one or more of the plurality of virtual elements.

8. The method of claim 7, wherein the virtual elements are representations of flowers and the change in property is an increase in a growth speed of the representation of the flowers.

9. The method of claim 1, further comprising: providing, to the client device, second AR data for the AR experience, the second AR data representing the virtual world.

10. A non-transitory computer-readable storage medium comprising instructions for providing an augmented reality (AR) experience in a parallel-reality application in which a geography of a virtual world parallels a geography of at least a portion of a real world, the instructions executable by a computing system and comprising:
   instructions for receiving a connection request from a client device;
   instructions for receiving a route that the client device traversed in the real world, the route comprising a plurality of locations in the real world;
   instructions for determining a plurality of virtual locations at which to place virtual elements, each virtual location corresponding to one of the locations in the real world of the route;
   instructions for updating a global state of the AR experience to include the plurality of virtual elements at the plurality of virtual locations; and instructions for providing, to a second client device, AR data that causes the second client device to display at least some of the virtual elements at at least some of the virtual locations corresponding to at least some of the locations in the real world.

11. The non-transitory computer-readable storage medium of claim 10, wherein each of the plurality of virtual elements are included in the global state at the virtual location in real-time responsive to receiving an indication from the client device that the client device is located at the location in the real world corresponding to the virtual location of the route.

12. The non-transitory computer-readable storage medium of claim 10, wherein each of the plurality of locations in the real world is represented by global positioning system coordinates.

13. The non-transitory computer-readable storage medium of claim 10, wherein the instructions for providing the AR data to the second client device comprise:
instructions for receiving a current location of the second client device; and
instructions for providing, to the second client device and subsequent to determining that the second client device being within a threshold distance of the route, the AR data for display.

14. The non-transitory computer-readable storage medium of claim 10, the instructions further comprising:
instructions for determining a type of virtual element associated with a user of the client device, wherein each of the plurality of virtual elements are of the type associated with the user.

15. The non-transitory computer-readable storage medium of claim 10, wherein the plurality of virtual elements are of a first type, the instructions further comprising:
instructions for determining that one or more of the plurality of virtual elements are within a threshold distance of one or more of a second plurality of virtual elements mapped to virtual locations corresponding to a second route in the real world, the second route traversed by the second client device or a third client device, wherein the second plurality of virtual elements is of a second type; and
instructions for generating a third plurality of virtual elements of a third type, wherein the third type is selected from a plurality of possible types based on the first type and the second type.

16. The non-transitory computer-readable storage medium of claim 10, the instructions further comprising:
instructions for changing, subsequent to determining that the second client device or a third client device is within a threshold distance of one or more of the plurality of virtual elements, a property of the one or more of the plurality of virtual elements.

17. The non-transitory computer-readable storage medium of claim 16, wherein the virtual elements are representations of flowers and the change in property is an increase in a growth speed of the representation of the flowers.

18. The non-transitory computer-readable storage medium of claim 10, the instructions further comprising:
instructions for providing, to the client device, second AR data for the AR experience, the second AR data representing a virtual world.

19. A computer system comprising:
a computer processor; and
a non-transitory computer-readable storage medium storing instructions for providing an augmented reality (AR) experience in a parallel-reality application in which a geography of a virtual world parallels a geography of at least a portion of a real world, the instructions that when executed by the computer processor cause the computer processor to perform actions comprising:
receiving a connection request from a client device;
receiving a route that the client device traversed in the real world, the route comprising a plurality of locations in the real world;
determining a plurality of virtual locations at which to place virtual elements, each virtual location corresponding to one of the locations in the real world of the route; updating a global state of the AR experience to include the plurality of virtual elements at the plurality of virtual locations; and
providing, to a second client device, AR data that causes the second client device to display at least some of the virtual elements at at least some of the virtual locations corresponding to at least some of the locations in the real world.

20. The computer system of claim 19, wherein each of the plurality of virtual elements are included in the global state at the virtual location in real-time responsive to receiving an indication from the client device that the client device is located at the location in the real world corresponding to the virtual location of the route.

* * * * *